United States Patent [19]

Nithammer et al.

[11] Patent Number: 4,591,207
[45] Date of Patent: May 27, 1986

[54] CONTINUOUSLY VARIABLE ADJUSTABLE HINGE

[75] Inventors: Egon Nithammer, Plainwell; Karl H. Ligensa, Battle Creek; Fred C. Kresky, Richland, all of Mich.

[73] Assignee: Keiper Recaro Inc., Battle Creek, Mich.

[21] Appl. No.: 719,864

[22] Filed: Apr. 4, 1985

Related U.S. Application Data

[63] Continuation-in-part of Ser. No. 595,591, Apr. 2, 1984, abandoned.

[51] Int. Cl.⁴ ............................................. A47C 1/026
[52] U.S. Cl. .................................... 297/366; 297/355; 297/362; 297/367
[58] Field of Search ............... 297/366, 354, 355, 367, 297/368, 369; 16/354, 360, 332, 334, 333, 345

[56] References Cited

U.S. PATENT DOCUMENTS

| | | | |
|---|---|---|---|
| 3,479,088 | 11/1969 | Bonnaud | 297/366 |
| 4,103,964 | 8/1978 | Klingelhofer et al. | 297/367 |
| 4,146,267 | 3/1979 | Mori et al. | 297/367 |
| 4,223,946 | 9/1980 | Kluting | 297/367 X |
| 4,337,978 | 7/1982 | Kazaoka et al. | 297/367 |
| 4,457,557 | 7/1984 | Une | 297/367 X |

FOREIGN PATENT DOCUMENTS 219321 2/1968 Sweden ............................. 297/355

Primary Examiner—William E. Lyddane
Assistant Examiner—Laurie K. Cranmer

[57] ABSTRACT

Continuously adjustable hinge, such as employed for automotive vehicle recliner seat back, wherein a toothed sector on one hinge element is retained by a toothed pawl on the other which has freedom of mounting connection at least equal to the pitch of one tooth in order to accommodate full tooth engagement for any continuously variable relative position of the sector. A pair of pivotally anchored cam elements engage angularly related cam surfaces on the pawl after its full tooth engagement with the sector. Variable travel of cam surface to accommodate fully engaged prepositioned pawl with self-locking angle resisting pawl displacement in either angular direction from sector tooth pressure, is sufficient to accommodate at least one tooth displacement of the pawl in order to lock the pawl in any position of initial full tooth engagement.

39 Claims, 10 Drawing Figures

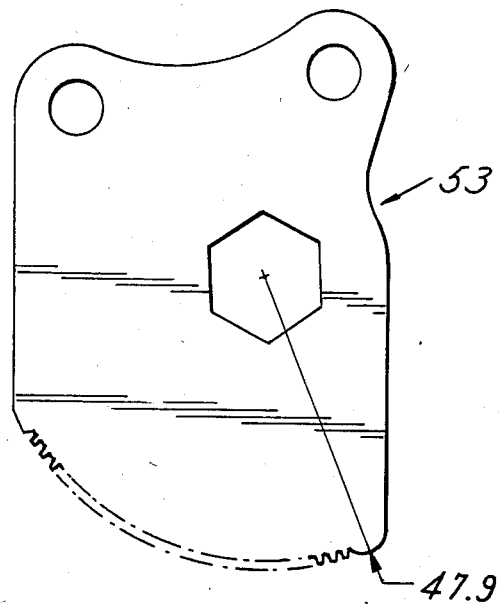
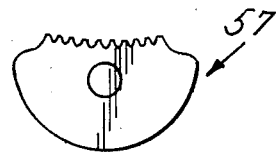
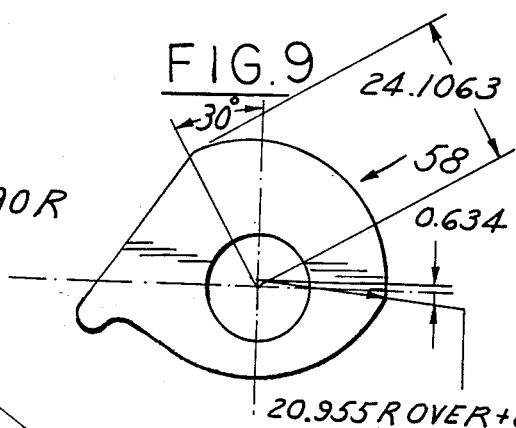
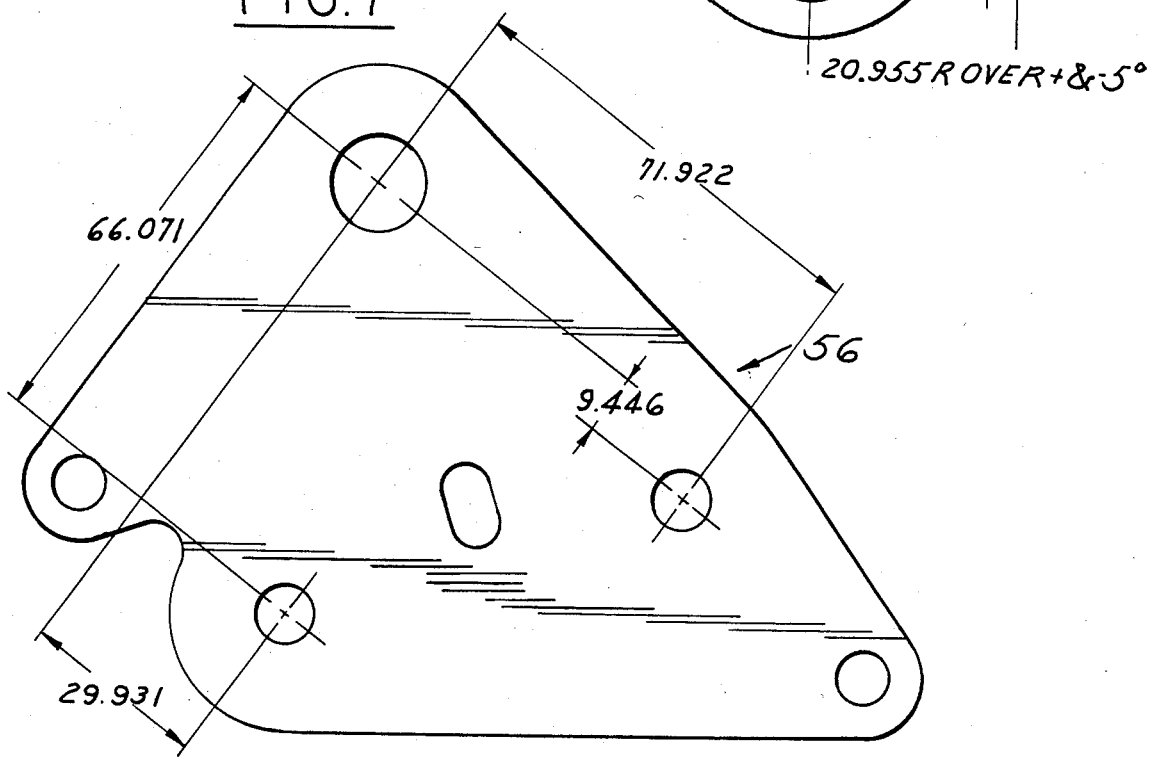

CONTINUOUSLY VARIABLE ADJUSTABLE HINGE

This application is a continuation-in-part of application Ser. No. 595,591 filed on Apr. 2, 1984, now abandoned, entitled "Continuously Variable Adjustable Hinge".

BACKGROUND OF THE INVENTION

In the field of automotive seat recliners continuously variable adjustment has been achieved through "taumel" type gearing actuated, in the case of manual adjustment, by rotating a cam through a hand knob which produces a one tooth relative progressive movement between external and internal gears of the taumel mechanism for every revolution of the hand knob. Self-locking friction of the elements produces a satisfactory locked condition for any position of continuous adjustment; however, gross adjustment between extreme positions is relatively slow as compared to the ratchet and pawl type of recliner hinges in general use in the United States, such as disclosed in U.S. Pat. No. 4,223,947, wherein a handle actuated cam releases a pawl from engagement with a toothed sector to accommodate rapid postitioning of the seat back whereupon release of the hand lever permits cam locking of the pawl in toothed engagement with the sector. In such hinges adjustment positions are incrementally limited to a single tooth differential in relative sector and pawl positions.

In order to satisfy industry demand for rapid plus finer adjustment than is possible with conventional sector and pawl tooth pitch, various approaches have been tried. Thus, in U.S. Pat. Nos. 4,223,946 and 4,355,846 an additional "translation" linkage has been incorporated to amplify the angular movement of a toothed sector in relation to the angular seat back movement so as to correspondingly reduce the angular displacement of the seat back for a one tooth adjustment in the engagement of pawl and sector. In another case, as shown in U.S. Pat. No, 4,295,682 an exceptionally fine tooth pitch has been accommodated through use of a special clamping action in the cam actuated mechanism for more positively resisting tooth disengagement through deflection of the inter-engagement elements.

While some improvement in fineness of adjustment has been achieved by such means, the ideal of true continuously variable adjustment combined with rapid gross adjustment to desired seat back position has never heretofore been satisfactorily achieved. Various attempts at friction locks have never been able to withstand life testing under impact loads, which safety standards have required, within space and cost confines involved in the parameters of seat hinge design.

SUMMARY OF THE PRESENT INVENTION

A complete solution to the long existing search for rapid gross and continuous final adjustment has at last been achieved wherein the locking strength of conventional toothed sector and pivoted pawl self-locking cam actuation has been retained with continuous adjustment provided by permitting the pawl to float within a single tooth pitch to a fully engaged position for any precise adjustment of a conventional toothed sector, followed by the locking of the pawl in such adjusted retaining position by actuation of dual cams on angularly related surfaces of the pawl, and with provision of a variable travel of the relative cam engaging surfaces to accommodate the one tooth differential position of the pawl in reaching its initial fully engaged position. Pawl and cam geometry has been employed with sufficient length of cam surfaces in order to accommodate the single tooth preliminary float of the pawl in reaching its initial full tooth engagement with the sector with a self-locking angle, no greater than 6°, prevailing throughout the entire range of cam travel.

In addition to the dual pivoted cam elements, which are simultaneously actuated by a single handle to a retracted position, a link for positively disengaging the pawl teeth from the sector is adapted to retain the pawl in a centered relative position for preliminary tooth engagement which is completed by a spring bias before cam engagement of the pawl occurs. Extension arms of the respective cams are biased by a connecting tension spring toward pawl engagement permitted by release of the hand lever. Respective cam engagement may occur either successively or simultaneously depending on the particular initial engaged position of the pawl. In either case full seating of the dual cams in a locked condition with all clearance taken up is achieved without displacing the pawl from its initial fully engaged position.

The triangular relationship of the dual cam pivots with the tooth engagement of the pawl and effective angle of cam surface engagement are adapted to establish a self-locking angle from any compressive pressure arising from tooth pressure in either direction. Accordingly, while strength and retention properties of cam seated toothed pawl and sector construction have been fully retained, provision of single tooth pawl float and secondary dual cam locking have achieved the fully continuously variable adjustment combined with rapid gross seat back positioning which has been the illusive object of recliner hinge designers for many years.

Modifications are possible employing the principle of the floating pawl fully engageable with sector teeth in any relative angular adjustment relation of seat and back rest brackets locked against angular displacement by dual cam action each cam having variable self-locking angular displacement sufficient to accommodate the complete range of at least a single tooth variation in adjustment thereby making the complete range of bracket adjustment continuously variable. However, applicants have found through experimental testing a specific preferred embodiment which has demonstrated the greatest durability under severe life testing without incurring any malfunction. A detailed description of such preferred embodiment has been added as a continuation-in-part disclosure to the parent application embodiments of FIGS. 1 and 2.

In a preferred embodiment developed since the filing of the parent application a stub tooth profile has been employed permitting a reduced tooth angle and corresponding reduction in stress incident to the separating force between pawl and sector instant to the radial component of tooth pressure. The rotation of the dual cams has been reversed so that the geometry of forces on the pawl incident to seat back loading urges the loaded cam toward a higher position and therefore more resistant to creep from cyclical loading. The pawl has been simplified to operate as a tooth slide without a pivot and eliminating the pivot arm. A new system of release and pawl control accommodates flat tooth ends of the shallow angle stub teeth and utilizes reaction ends of torque springs for biasing the respective cams toward engaging position to urge the pawl toward the sector and shifted into full tooth engagement prior to cam seating for locking the pawl in position. The geometry of cam resistance to pawl tooth loading has been optimized to centralize resultant forces from seat load torque on the sector and tooth couple tending to dislodge the pawl on the axis of the loaded cam pivot and to provide a splined cam contour to minimize deviation over the full range of cam pawl engagement.

BRIEF DESCRIPTION OF THE DRAWINGS

FIG. 6 is a detailed view of the quadrant with tooth sector;

FIG. 7 is a detailed view of the lower bracket plate;

FIG. 8 is a detailed view of the tooth slide form of pawl;

FIG. 9 is a detailed view of the cam employed in the test unit;

DESCRIPTION OF INITIAL PREFERRED EMBODIMENTS

Figure 1:
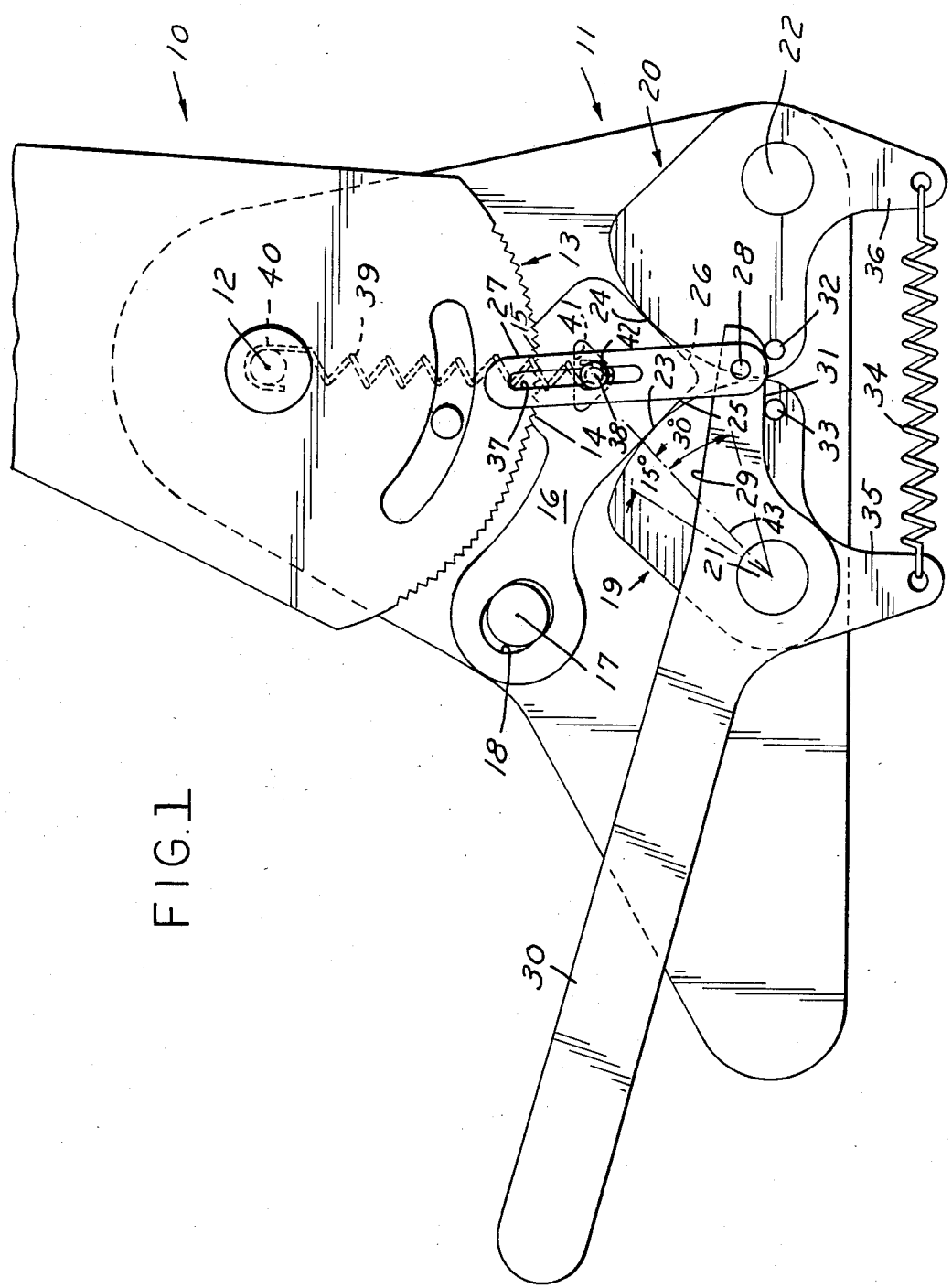
FIG. 1 is a side elevation of a hinge assembly illustrating one preferred embodiment of the present invention.

With reference to FIG. 1 upper hinge bracket 10 and lower hinge bracket 11, which may be respectively connected to an automotive vehicle seat back and seat, are pivotally connected at 12. Circular arc sector 13 of upper bracket 10 is provided with teeth 14 engaged by matching teeth 15 of pawl 16 loosely mounted by pin 17 on bracket 11 through elongated slot 18 providing sufficient lost motion for pawl teeth 15 to fully engage adjacent teeth of sector 13 at any relative angular position of brackets 10 and 11, provided that pawl 16 is approximately centered with respect to mounting pin 17 and slot 18 upon initial engagement of pawl teeth 15 with sector teeth 14.

Cams 19 and 20, pivotally mounted on bracket 11 respectively by pins 21 and 22, are provided with eccentric cam faces 23 and 24 engageable with angularly related flats 25 and 26 on pawl 16. Cam faces 23 and 24 are of sufficient operative arc, e.g. 45°, and throw to engage pawl flats 25 and 26 with a locking angle, e.g. 5½°, at whatever fully engaged pawl position may be established by the relative position of bracket 10, within a single tooth variation accommodated by elongated slot 18. It will be understood that the relative angular relationship of cam faces 23 and 24, in reaching an engaging position with flats 25 and 26 will vary with the displacement of pawl 16 on either side of the center position shown in FIG. 1 within the single tooth pitch accommodated by elongated slot 18.

At whatever intermediate position pawl 16 assumes in reaching full engagement with sector 13 prior to respective cam engagements with the pawl, the locking angle provided by the cam engagements will effectively retain pawl 16 against displacement in either direction under interengaging sector tooth pressure thus providing an effective lock for bracket 10 relative to bracket 11 in any continuously adjusted position.

It will be further understood that effective continuously variable adjustment requires full engagement of pawl teeth 15 with sector teeth 14 prior to engagement of either cam face with its associated pawl surface, as well as the aforementioned approximately centered orientation of pawl 16 upon entering tooth engagement with sector 13. Proper sequence of pawl positioning before cam engagement and preliminary centering of the pawl for initial tooth engagement is provided by link 27 actuated by pin 28 projecting from extension 29 of release handle 30 pivotally mounted at 21 to bracket 11. Such handle is adapted, upon clockwise actuation of handle 30, through engagement by face 31 of extension 29 with pins 32 and 33 projecting from cams 19 and 20, to release cam engagement with pawl 16 against engagement bias of tension spring 34 connecting arm extensions 35 and 36 of cams 19 and 20. Linear displacement of link 27 by handle 30 to the limit of slot 37 relative to pin 38 projecting from the face of pawl 16 into slot 37 will provide for positive disengagement of pawl and sector against the bias of tension spring 39 anchored to pivot projection 40 on the underside of bracket 11 and connected at its other end to an extension of pin 38 of pawl 16 projecting through triangular slot 41 in bracket 11. Such release engagement of pin 38 by the end of slot 37 takes place after release actuation of both cam faces 25 and 26 under any extremity of engagement of either cam face and centers the pawl relative to slot 18 by engagement of pin 38 with the matching accurate end 42 of slot 41. Extremities of cam movement are indicated in the case of cam arm 19 by arcs extending 15° and 30° respectively on either side of neutral line 43 corresponding with the neutral position of pawl 16 as shown.

Upon return travel of handle 30 in a counterclockwise direction, the same linkage under tension of spring 39 on pin 38 will cause centered pawl 16 to engage pawl teeth 15 with teeth 14 of sector 13 prior to return of cam faces 234 and 24 to engagement of pawl flats 25 and 26 which will take place with no shifting of the pawl from its prepositioned full tooth engagement at whatever precise continuously adjustable position of seat bracket 10 prevails at the time of initial pawl engagement.

An appropriate tooth form is illustrated in FIG. 1 provided with 2⅓° pitch and sharp pointed teeth on both pawl and sector, manufactured by conventional broaching operation, which adequately assure against relative pawl and sector tooth point engagement which would prevent the pawl from entering into full tooth engagement for the prevailing position of the sector.

An alternative manufacturing process of "fine blanking" the sector and pawl teeth is not appropriate for such sharp teeth since a slight point radius is inherently required in the fine blanking dies. Any such radius increases the potential for relatively pawl and sector tooth point engagement such as to interfere with full tooth engagement.

Figure 2:
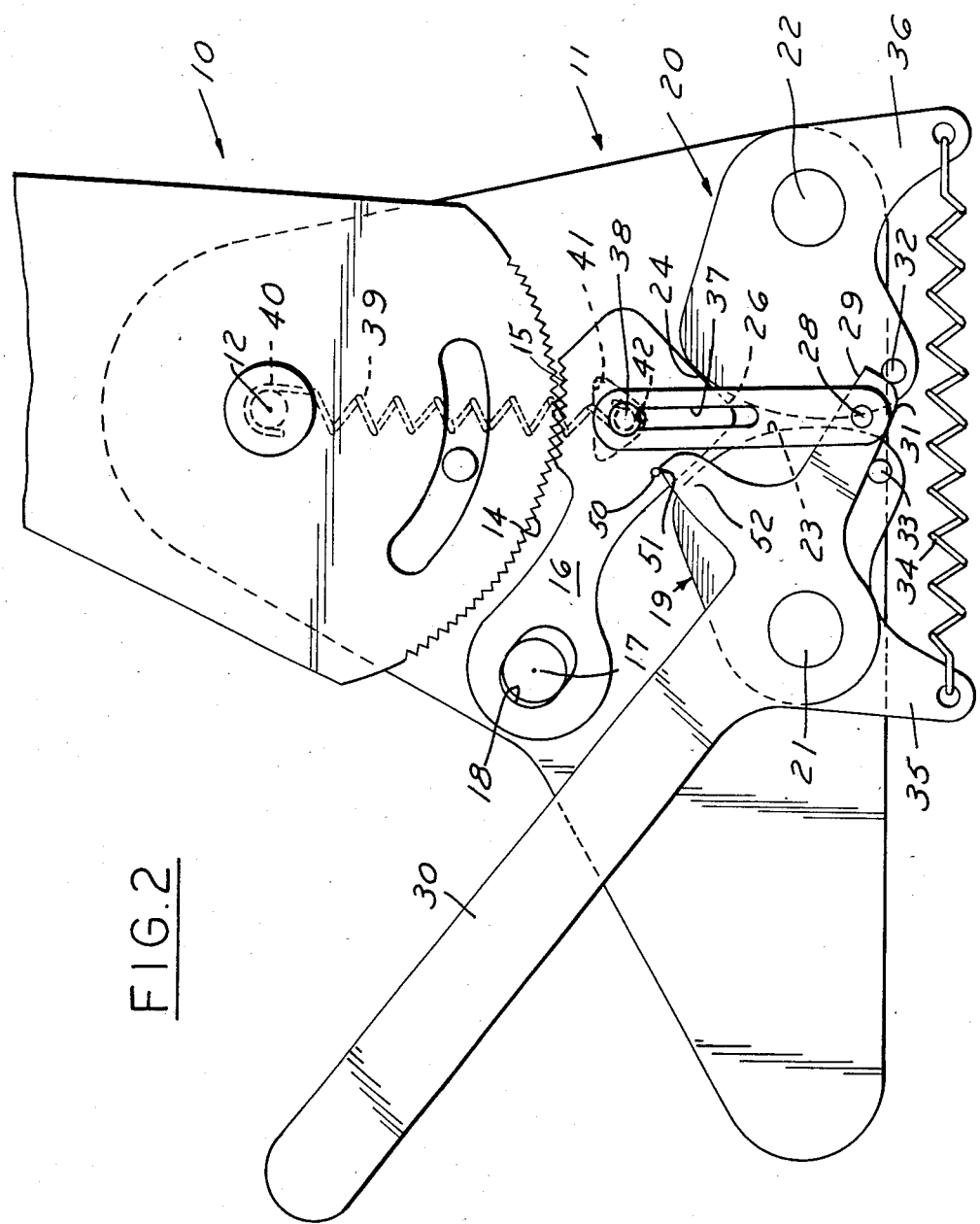
FIG. 2 is a fragmentary view of a modification of the hinge fitting of FIG. 1.

With reference to FIG. 2 an optional modification may be incorporated to positively move the pawl laterally from a position of relative tooth point inter-engagement such as to make less critical the necessity for sharp tooth point form and render fine blanking a viable alternative manufacturing process with the hinge fitting of the present invention. In order to effect lateral movement of the pawl in the event of point interengagement interrupting full engagement, a small pin 50 projecting from the pawl face is positioned in the path of the end point 51 of arm extension 52 which reach relative proximity positions at the moment of incipient tooth point engagement of pawl and sector teeth upon return travel of the pawl and actuating handle.

If the pawl teeth enter on either side of the sector teeth sufficiently to result in full engagement, arm extension 51 will pass under the pin without engaging same during return of the cams to seated positions; however, if full pawl engagement is nterrupted by engagement of aligned tooth points, extension end 51 will engage pin 50 shifting the pawl laterally to the left sufficiently to drop into full tooth engagement prior to retention engagement seating of cams 19 and 20.

Since the pawl and handle extension will always reach an identical relationship at the time of incipient tooth engagement, pin 50 will always be in an effective position relative to point 51 to perform its function if necessary.

DESCRIPTION OF SUPPLEMENTAL PREFERRED EMBODIMENT

Figure 4:
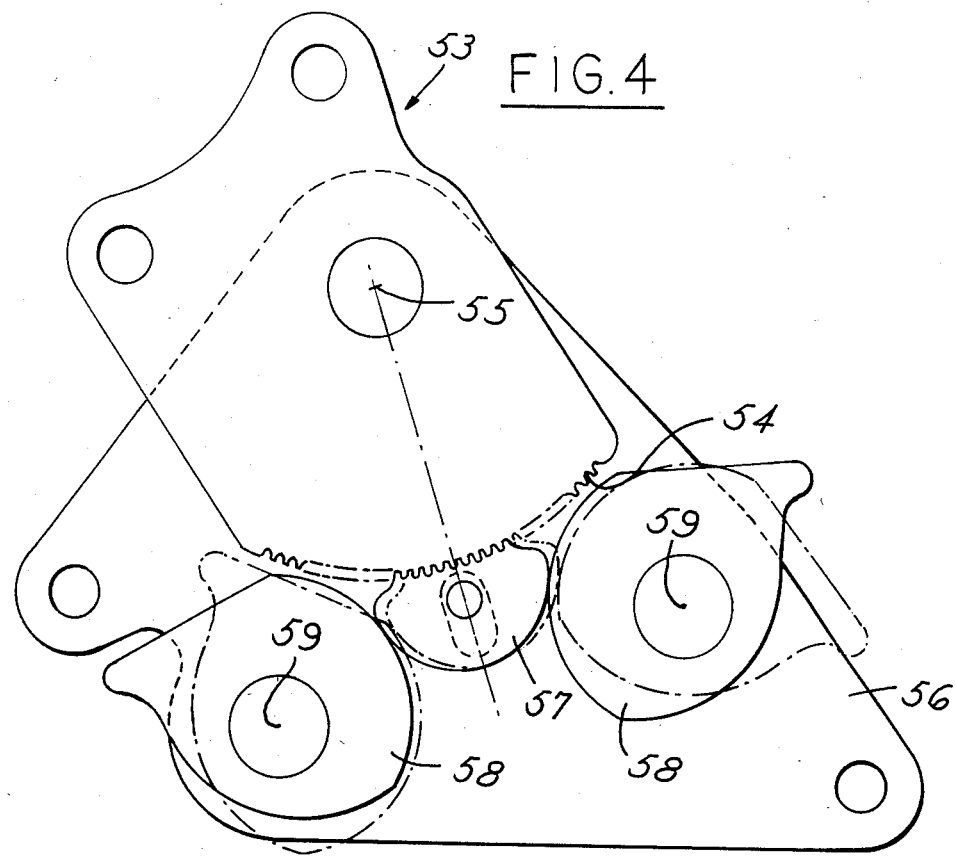
FIG. 4 is a side elevation of a test unit illustrating the geometry of sector pawl and locking cams over the range of pawl displacement from neutral to one extremity.

With reference to FIG. 4 adjustable locating elements of the test unit include quadrant 53 with tooth sector 54 centered on pivot 55 extending between sandwiched lower bracket plates 56, (one omitted for clarity), tooth slide pawl 57, dual cams 58 pivoted respectively at 59 between lower brackets 56. In FIG. 4 cams 58 and pawl 57 are illustrated in full line in neutral position and in broken line with pawl 57 shifted to one extremity; while in FIG. 5 pawl 57 and cams 58 are again illustrated in full line with broken lines illustrating the pawl shifted to the opposite extremity. The total range of movement of pawl 57 is in the order of 3° to accommodate infinite adjustment of quadrant 53 with 2½° tooth spacing. Pawl 57 is provided with a circular arc that includes the curvature at a contact zone with cams 58 which occurs over a very limited band throughout the full range of adjustment.

The illustrated cam rise of approximately 120° is based on an effective coefficient of friction no less than 0.07 and is developed as a spline curve of substantially constant locking angle slope relative to a line extending from the cam pivot to point of pawl contact. It is to be noted that the cam rise is oriented to provide a minimum dimension to pivot center at the lower ends and maximum at the upper so that any tendency of pawl 57 to lift out of engagement with sector teeth would tend to roll either cam to a higher rather than lower point of engagement, as is the case with an opposite cam rise such as employed in the FIGS. 1 and 2 embodiments. It has been found in experimental testing that the cam rise of FIGS. 4 and 5 most effectively opposes any creeping tendency of the cam surface under repeated cycling of high seat back loads.

The relative convex curvatures of cam and pawl at the contact zone minimize any deviation from optimum geometry of force vectors as will be later explained with reference to FIG. 10.

The test components illustrated in FIGS. 4–9 were developed to meet the requirements for an infinite seat back adjuster. As a specific example of components which have passed cyclical torque loading tests, FIGS. 6–9 have been dimensioned in millimeters which satisfactorily establish critical geometric relationships. As additional specifications brackets 56 were constructed of AISI 1018 steel, 4.5 millimeters thick; the quadrant of SAE 1020 steel, 4½ millimeters thick with heat treatment KN086240 and the pawl of AISI 4130 steel, 6 millimeters thick, quenched and tempered to Rockwell C38-48; and the cams of AISI 4130 steel, 6 millimeters thick quenched and tempered to Rockwell C38-45.

Figure 10:
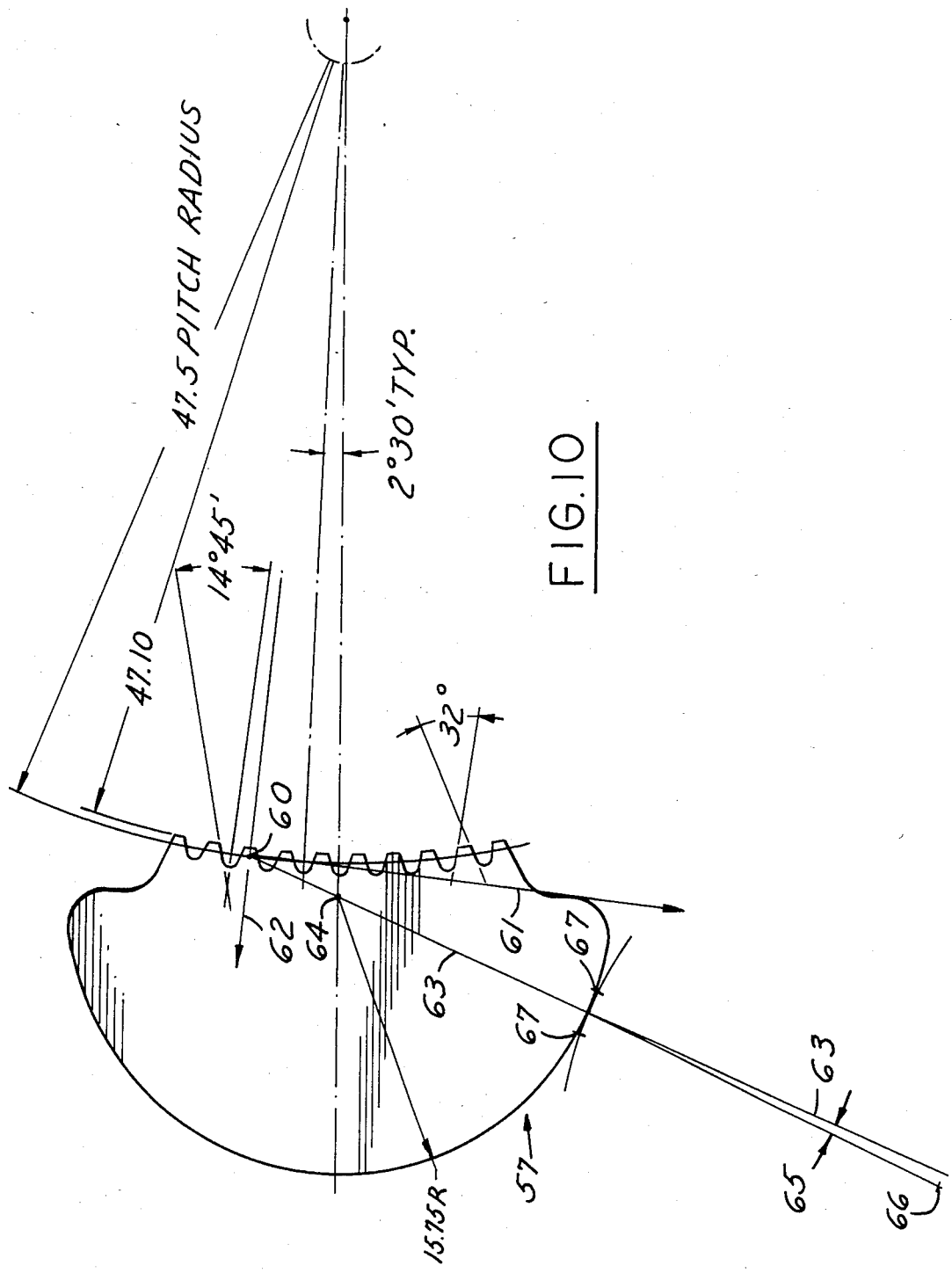
FIG. 10 is an enlarged schematic view illustrating the pawl, tooth sector and cam force geometry of the test unit.

With reference to FIG. 10 the geometry of forces leading to the location of cam pivots may be understood from the following analysis. A suitable number of pawl teeth was determined relative to the shear stress incident to ultimate maximum torque load together with a suitable number appropriate for pawl stability, determined in the present case to be 10 pawl teeth formed with stub teeth as shown having a 14° 45′ pressure angle and 2½° spacing. A determination of the center point of tooth loading 60 together with a summation of vector forces 61 and 62 indicent respectively to the tangential torque load at the center point of tooth loading and the radial component incident to the 14° 45′ pressure angle established resultant line 63 which passes near a center of curvature 64 for the circular arc of the pawl at the point of contact.

The optimum center of cam curvature to neutralize against any torque imposed on the cam lies near an extension of 63, and in order to provide a bias against any tendency for pawl separation incident to the summation of individual tooth loads, and additional 2° angle 65 has been provided, resulting in a line passing through cam curvature center located at 66, and passing through the pawl curvature center. In addition to such bias, it will be seen that any tendency of the pawl to lift would tend to roll the cam to a higher rise position thereby additionally resisting any pawl displacement from full contact with sector teeth.

Due to the convex curvatures of pawl and cam at the contact point, a 2½ single tooth displacement of the pawl over its range of seated positions to accommodate infinite adjustment results in a very narrow band of contact on the pawl such as between points 67 which will minimize any deviation from optimum geometry relative to cam axis over the complete range of adjustment.

Tests have demonstrated that with dimensions and geometry described above there is no tendency for pawl displacement or cam creep under cyclical maximum torque loading, even with the unloaded cam removed from contact.

Figure 3:
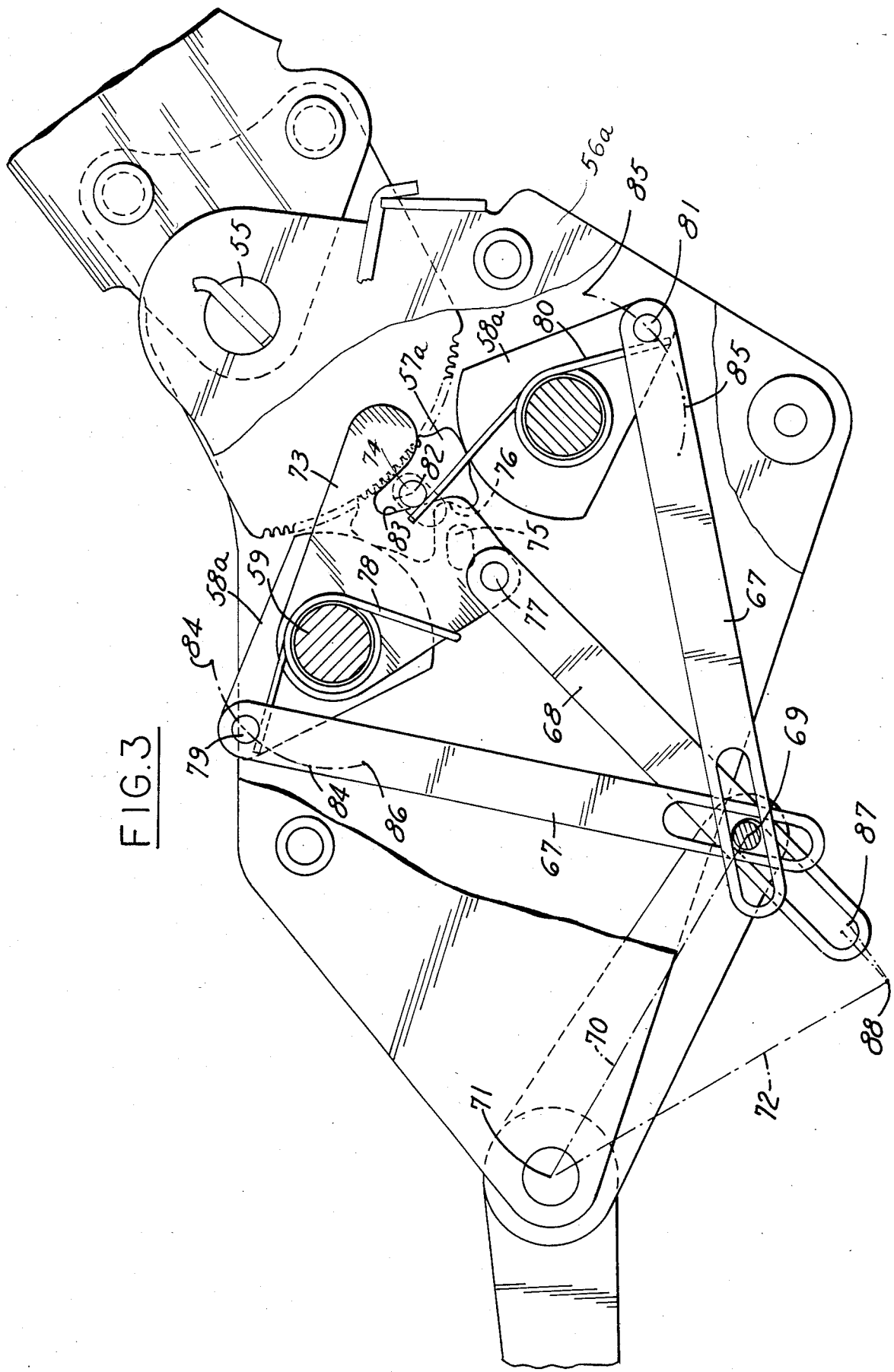
FIG. 3 is a side elevation of a seat hinge assembly illustrating a preferred embodiment of the present invention.

Referring to FIG. 3 assembly, modified pawl 57a and cams 58a are adapted for a shorter arc of cam travel and release and kicker mechanism. Pawl 57a and cams 58a are shown in neutral position. Two cam actuating links 67 and kicker actuating link 68 are driven in extremities of their respective slotted openings by pin 69 at the end of manual release lever 70 pivoted at 71 and manually movable to dotted line position 72. They successively release cams 58a and then actuate kicker 73, pivoted at 59, to engage pawl pin 74 to move it out of tooth engagement against semi-pierce projection 75 causing pawl 57a to shift to the left within the limit of recess 76 seated against semi-pierce projection 75.

Downward actuation of link 68 engaging kicker pin 77 overcomes torque spring 78, which is biased to urge pin 79 of link 67 in a cam engaging direction and reactively urge kicker 73 in a counterclockwise direction; likewise overcoming torque spring 80 biased to urge cam pin 81 in a cam engaging direction and pawl pin 74 in a tooth engaging direction. Thus, upon movement of hand lever arm 70 from its release position 72, pawl pin 74 will be raised by the engaging end of torque spring 80 towards sector tooth engagement and, upon any abutment of flat tooth ends of respective pawl and sector, ramp surface 82 of kicker 73 will shift pawl 57a to the right until full tooth engagement is produced whereupon pawl 57a will become fully engaged in adjusted position prior to return of cams 58a to their respective engaging positions.

Figure 5:
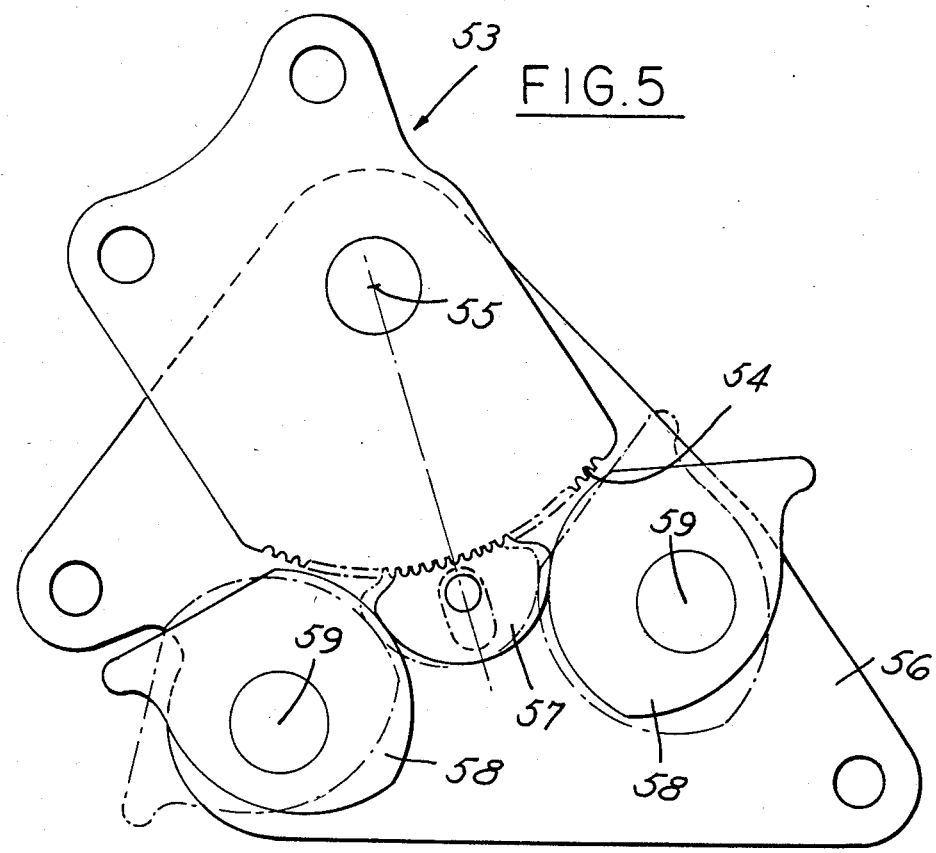
FIG. 5 is a view similar to FIG. 4 illustrating the pawl displacement from neutral to the other extremity.

While cams 58 in FIGS. 4, 5 and 9 are illustrated with 120° arc of cam rise based on a 0.07 coefficient of friction encountered with conventional lubricating grease, special high traction lubricants such as produced by Monsanto Chemical Company under the tradename "Santotrac" provide higher effective coefficients in the order of 0.12 permitting a reduction in cam arc to approximately 70° for effecting the same rise as illustrated in FIGS. 4 and 5. Such shorter arc is employed with the release mechanism of FIG. 3 in moving pin 79 of link 67 between extremity cam engaging limits indicated at 84 and link pin 81 between extremity limits 85. The further travel of link 67, e.g. to position pin 79 to a further extremity 86 to accommodate actuation of kicker 73 by link 68, is made possible upon moving actuating pin 69 from a position 87 at the bottom of the slot position 88 at the limit of release travel 72.

Ramp surface 83 extends sufficiently to permit completion of initial tooth entry without blocking engagement of pawl and sector tooth ends; however, if such engagement occurs a shift of pawl 57a to the right is produced by ramp 83 until a full engaging relation is reached. Slot 82 in upper bracket plate 56a confines total movement of pawl 57a to approximately 3°, sufficient for full 2⅓° tooth spacing, by limiting lateral movement of pawl pin 74.

From the foregoing description of several embodiments it will be understood that the invention comprehends various specific means for accomplishing the positive anchoring of a toothed pawl to accommodate continuously variable adjustment of a pivoted toothed sector. Such construction is particularly adaptable in its application to seat recliner hinges to accommodate rapid release and seat back adjustment to exact desired location and positive locking with strength advantages of proven toothed pawl and sector system, but without the previous disadvantage of limited incremental adjustment.

We claim:

1. Assembly of pivotally connected elements characterized by continuously variable adjustable means for locking the relative angular relation of said pivotally connected elements comprising, toothed means on one of said elements and matching interengageable toothed means on the other of said elements, mounting means for one of said toothed means accommodating complete disengagement of said respective toothed means during adjustment of said relative angular relation, said mounting means including means for accommodating full matching tooth engagement of said respective toothed means for any continuously variable adjustable angular relation of said elements, and cam means engageable with said one of said toothed means after establishing full matching engagement of said respective toothed means for locking said respective toothed means against any relative displacement in said relative angular relation of said elements.

2. The assembly of claim 1 wherein said pivotally connected elements comprise bracket members of a hinge.

3. The assembly of claim 1 including means for producing relative lateral tooth displacement in the event of respective tooth point preliminary engagement interfering with full tooth engagement.

4. The assembly of claim 1 including individually positionable dual cam surface of said cam means individually engageable with angularly related surfaces of one of said toothed means for opposing relative displacement of said elements from tooth pressure in each angular direction.

5. The assembly of claim 4 wherein each of said dual cam surfaces is provided with a reactive mounting on one of said elements accommodating independent engagement of said angularly related surfaces.

6. The assembly of claim 5 wherein each of said dual cam surfaces is provided with a pivotal mounting and a frictional locking cam surface engagement angle relative to its pivotal mounting throughout the range of cam engagement.

7. The assembly of claim 4 wherein said angularly related surfaces comprise exterior surfaces of a toothed pawl.

8. The assembly of claim 4 wherein said dual cam surfaces comprise a surface of each of individual cam elements pivotally mounted on spaced pivots.

9. The assembly of claim 1 wherein said mounting means for accommodating full matching tooth engagement includes a lost motion connection sufficient to accommodate single tooth pitch displacement.

10. The assembly of claim 9 wherein one of said toothed means comprises a toothed pawl with said lost motion mounting.

11. The assembly of claim 6 including means for centering said pawl relative to said lost motion while initiating tooth engagement.

12. The assembly of claim 11 wherein said lost motion mounting and means for centering includes a pawl pin projecting into a mounting aperture, and resilient means within said aperture actuating said pin to bias said pawl toward a central engaging position.

13. The assembly of claim 1 wheren said pivotally connected elements comprise bracket members of a hinge adapted for use as an adjustable seat back hinge.

14. The assembly of claim 13 including manually actuable handle means adapted to actuate said cam means to a release position for effecting adjustment, and resilient means for restoring said cam means to an engaging position upon manual release of said handle.

15. The assembly of claim 14 including dual individually pivoted cam means responsive to single handle actuation.

16. The assembly of claim 14 including dual cam means individually pivoted, and pawl means engageable by said dual cam means, said resilient means for restoring said cam means to an engaging position comprising individual pivotal mounting for each of said dual cam means, with an individual torque spring biasing each of said dual cam means to engaging position.

17. The assembly of claim 1 wherein one of said elements includes a toothed sector having an arcuate center coincident with said pivotal connection.

18. The assembly of claim 17 wherein said toothed sector is convex, and the other of said toothed means comprises a pawl having a matching concave toothed arc.

19. The assembly of claim 17 wherein one of said toothed means comprises a toothed pawl, having a limited lost motion connection with the other of said elements, engageable with said toothed sector, said pawl being locked in adjusted position by said cam means.

20. The assembly of claim 19 including handle actuated resilient linkage to disengage said pawl following disengagement of said cam means, and to fully restore pawl engagement prior to re-engagement of said cam means.

21. The assembly of claim 19 including means for centering said pawl to re-engagement at any adjusted position of said sector within the lost motion limits of said pawl connection.

22. The assembly of claim 21 including means for displacing said pawl laterally from its centered position in the event of aligned relative tooth point engagement interfering with full tooth re-engagement at said adjusted position.

23. The assembly of claim 22 wherein said means for displacing said pawl, laterally comprises a projection on said pawl engageable by an extension of said handle upon interrupted re-engagement of said pawl and sector teeth at said adjusted position.

24. The assembly of claim 21 wherein said means for centering said pawl comprises a pawl pin projecting into an aperture having a centering corner and means for moving said pin into said centering corner upon disengagement from said sector.

25. The assembly of claim 19 including means for producing lateral movement of said pawl in the event of aligned preliminary tooth point engagement of said pawl and sector teeth interfering with full tooth engagement.

26. Adjustable seat back hinge comprising pivotally connected seat and seat back brackets, a toothed sector on one of said brackets, a toothed pawl for retaining said toothed sector in adjusted relation to the other of said brackets, and means for releasably positioning said pawl in fixed adjusted engagement with said sector, characterized by means for mounting said pawl with sufficient freedom to accommodate at least one tooth shift in position relative to said sector, angularly related surfaces on said pawl, a pair of cams separately pivotally mounted on said other bracket with individually positionable dual cam surfaces individually engageable with said angularly related surfaces for resisting displacement of said pawl from any position of initial engagement with said sector at any infinitely adjustable relative angle of said brackets, means for sequentially moving said pawl into initial engagement with said sector at any given adjusted relative position of said brackets and then moving said cams into retaining engagement with said pawl.

27. The hinge of claim 26 including stub tooth profile for sector and pawl teeth.

28. The hinge of claim 27 wherein said tooth profiles provide a pressure angle in the order of 14¾°.

29. The hinge of claim 28 including tooth spacing of approximately 2½°.

30. The hinge of claim 29 wherein cam and pawl contact occurs on a line corresponding to the resultant of tangential tooth loading and radial loading incident to tooth pressure angle at the effective center of cumulative pawl tooth loading.

31. The hinge of claim 30 wherein convex curvature is provided at the contact surfaces of both pawl and cams.

32. The hinge of claim 31 including a pawl constructed as a simple tooth slide having convex cam contact areas at the resultant line of force on said pawl incident to tangential torque loading and tooth pressure angles for angular hinge displacement loading in either direction.

33. The hinge of claim 32 including a pawl control element pivotally mounted on the pivotal axis of one of said cams, a pawl control pin projecting from the surface of said pawl, pin contact surfaces on said pawl control element for moving said pawl into and out of engagement, resilient means urging said pawl control element toward pawl engagement with said sector and said respective cams into pawl locating engagement, and manual release means for sequentially disengaging said cams and actuating said control element in a pawl release direction.

34. The hinge of claim 33 including resilient means for returning said manual release means to sequentially permit reengagement of said pawl with said sector and then said cams with said angularly related surfaces.

35. The hinge of claim 34 including a common torque spring urging one of said cams and said control element toward said pawl engagement.

36. The hinge of claim 35 including another common torque spring urging respectively the other cam and said pawl toward engagement.

37. The hinge of claim 36 including means responsive to pawl release movement for shifting said pawl laterally toward one extremity for re-engagement with the sector, and ramp means on said pawl control element for shifting said pawl laterally in the other direction to a tooth meshing re-engagement position upon initial abutting engagement of respective pawl and sector stub teeth ends.

38. The hinge of claim 36 including three links connected respectively at one end to said cams and said pawl control element and at the other end to a manually actuated element of said manual release means, said link connections including lost motion for providing said sequential operation in release and reengagement of said pawl and cams.

39. The hinge of claim 32 wherein the surface of each cam is oriented to rise relative to pawl contact with cam surface movement away from said sector.

* * * * *